US006606326B1

United States Patent
Herring

(12) United States Patent
(10) Patent No.: US 6,606,326 B1
(45) Date of Patent: Aug. 12, 2003

(54) PACKET SWITCH EMPLOYING DYNAMIC TRANSFER OF DATA PACKET FROM CENTRAL SHARED QUEUE PATH TO CROSS-POINT SWITCHING MATRIX PATH

(75) Inventor: Jay R. Herring, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/347,161

(22) Filed: Jul. 2, 1999

(51) Int. Cl.[7] .......................... H04L 12/28; H04L 12/56
(52) U.S. Cl. ...................... 370/412; 370/413; 370/428; 710/52
(58) Field of Search ................................ 370/412, 413, 370/401, 389, 229, 428, 429; 710/52, 53

(56) References Cited

U.S. PATENT DOCUMENTS

| 4,475,192 | A |   | 10/1984 | Fernow et al. ................ 370/94 |
|---|---|---|---|---|
| 4,760,570 | A |   | 7/1988 | Acampora et al. ............ 370/60 |
| 5,274,642 | A |   | 12/1993 | Widjaja et al. ............... 370/94 |
| 5,291,482 | A |   | 3/1994 | McHarg et al. ............... 370/60 |
| 5,453,978 | A | * | 9/1995 | Sethu .......................... 370/60 |
| 5,546,391 | A | * | 8/1996 | Hochschild .................. 370/60 |
| 5,557,607 | A |   | 9/1996 | Holden ........................ 370/58 |
| 5,602,841 | A | * | 2/1997 | Lebizay ...................... 370/413 |
| 5,602,988 | A |   | 2/1997 | Haulin .................. 395/183.18 |
| 5,612,952 | A |   | 3/1997 | Motoyama .................. 370/412 |
| 5,805,589 | A | * | 9/1998 | Hochschild ................ 370/389 |
| 5,812,549 | A | * | 9/1998 | Sethu ........................ 370/389 |

* cited by examiner

Primary Examiner—Ajit Patel
Assistant Examiner—Chirag Shah
(74) Attorney, Agent, or Firm—Floyd A. Gonzalez, Esq.; Kevin P. Radigan, Esq.; Heslin Rothenberg Farley & Mesiti, P.C.

(57) ABSTRACT

A central queue-based packet switch contains multiple input ports and multiple output ports coupled by a central queue path and a bypass path. The central queue has only shared memory and processing dynamically switches from transfer of message portions across the central queue path to the bypass path whenever a next message portion is identified by an output port as a critical portion. Upon transfer of message forwarding to the bypass path, subsequent message portions are forwarded across the bypass path unless the output port signals for transfer of the message portions back through the central queue path. Dynamic switching of message transfer from the central queue path to the bypass path is accomplished irrespective of whether contention exists for the output port.

22 Claims, 6 Drawing Sheets

PACKET SWITCH EMPLOYING DYNAMIC TRANSFER OF DATA PACKET FROM CENTRAL SHARED QUEUE PATH TO CROSS-POINT SWITCHING MATRIX PATH

TECHNICAL FIELD

This invention relates in general to a central queue-based packet switch, illustratively an eight-way router, that advantageously allows for dynamic transfer of message portions of a single data packet from a shared central queue path to a cross-point switching matrix path coupled in parallel therewith between input ports and output ports of the packet switch.

BACKGROUND OF THE INVENTION

With the continual evolution and commercial availability of increasingly powerful, sophisticated and relatively inexpensive microprocessors, distributed, and particularly massively parallel, processing is being perceived in the art as an increasingly attractive vehicle for handling a wide spectrum of applications, such as transaction processing, heretofore processed through conventional mainframe computers.

In general, distributed processing involves extending a processing load across a number of separate processors, all collectively operating in a parallel or pipelined manner, with some type of interconnection scheme being used to couple all of the processors together in order to facilitate message passing and data sharing thereamong. In the past, distributed processing architectures, of which many variants exist, generally entailed use of a relatively small number of interconnected processors, typically two and often less than ten separate highly sophisticated central processing units as would be used in a traditional mainframe or super-minicomputer, in which these processors would be interconnected, either directly through, e.g., an interprocessor bus, or indirectly through, e.g., a multi-ported shared memory, such as a shared digital access storage device (DASD), or other communication path. By contrast, in massively parallel processing systems, a relatively large number, often in the hundreds or even thousands, of separate, though relatively simple, microprocessor based processing elements is interconnected through a communications fabric formed of a high speed network in which each such processing element appears as a separate node on the network. In operation, the fabric routes messages, typically in the form of packets, from any one of these processing elements to another to provide communication therebetween. Each of these processing elements typically contains a separate microprocessor and its associated support circuitry, the latter being typified by, for example, random access memory (RAM), for program and data storage, and input/output (I/O) circuitry. Based upon the requirements of a particular system, each element may also contain read only memory (ROM), to store initialization ("boot") routines as well as configuration information, and/or other circuitry.

Each distributed processing element, particularly in a massively parallel processing system, also contains a communication sub-system that interfaces that element to the communications fabric. Within each element, this sub-system is formed of appropriate hardware circuitry, such as a communications interface within the I/O circuitry, and associated controlling software routines, the latter being invoked by an application executing within that one element in order to communicate with any other such processing element in the system.

A primary and continuing goal in the design of any processing environment is to improve overall system performance. Given the growing importance of massively parallel processing systems, we will direct the remainder of this discussion to these particular systems.

The overall performance of a massively parallel processing system tends to be heavily constrained by the performance of the underlying network used therein. Generally speaking, if the network is too slow and particularly to the point of adversely affecting overall system throughput, it may sharply reduce the attractiveness of using a massively parallel processing system in a given application.

Specifically, in such a system, each processing element executes a given portion of an application. As such and owing to the interdependent nature of the processing among the elements, each processing element must be able to transfer data to another such element as required by the portions of the application then executing at each of these elements. Generally, if any one processing element (i.e. the "destination" element) requests data from another such element (i.e. the "originating" element), the destination element remains idle until it receives a message containing the needed data transmitted by the originating element, at which point the destination element once again commences application processing. Not surprisingly, a finite amount of time is required to transport a message containing the request from the destination to the originating processing elements and, in an opposite direction, a responding message containing the requested data. This time unavoidably injects a degree of latency into that portion of the application executing at the destination element. Since most processing elements in the system function as destination elements for corresponding portions of the application, then, if this communication induced latency is too long, system throughput may noticeably diminish. This, in turn, will significantly and disadvantageously degrade overall system performance. To avoid this, the network needs to pass each message between any two communicating processing elements as quickly as possible in order to reduce this latency. Moreover, given the substantial number of processing elements that are generally used within a typical massively parallel processing system and the concomitant need for any one element in this system to communicate at any one time with any other such element, the network must also be able to simultaneously route a relatively large number of messages among the processing elements.

In a massively parallel processing environment, the network is usually formed of a packet network rather than a circuit switched or other type of network. Inasmuch each inter-processor message itself tends to be relatively short but, at any one time, a very large number of these messages generally needs to be simultaneously routed through the network, packet networks provide the most efficient vehicle to carry these messages, in terms of reduced circuit complexity, and decreased network cost and physical size of the network including its associated switches.

To yield proper system performance, a massively parallel processing system needs to utilize a packet network, and particularly packet switches therein, that can route an anticipated peak load of inter-processor messages with minimal latency.

Unfortunately, in practice, packet switches that possess the requisite performance for use in a massively parallel processing system have proven to be extremely difficult to develop thereby inhibiting the continual advancement and use of such systems.

While various widely differing forms of packet switches exist in the art, one common architecture uses a cross-point matrix. In particular, such a switch utilizes multiple, e.g., "m" input ports and multiple, e.g., "n", output ports (where "m" and "n" are both integers), all of which are interconnected through an m-by-n matrix of cross-point connections. Fortunately, small cross-point type switches tend to be relatively simple and cost-effective to implement. Unfortunately, cross-point switches suffer primarily from input blocking and secondarily, and not particularly relevant here, to a need to quickly resolve output contention. If not for these serious idiosyncrasies and particularly input blocking, cross-point based switches would be preferred over other more complex and costly switch architectures that do not suffer from these particular affects.

In particular and operationally speaking, incoming packets contain a header field with an embedded routing code and a length field, an information field generally containing requested data, and finally a trailing field that may contain an error correcting code field as well as various message delimiters. The routing code generally specifies the particular input port on the switch at which the message originates and the particular output port on the switch for which the message is destined. The length field specifies the length, typically in bytes, of the entire message. The routing code and the length fields are generated by input circuitry associated with the network and appended, as a prefix, to the message prior to the message being routed therethrough. Input circuitry within the switch reads the routing code and then sets appropriate cross-point connections within the switch in order to link the desired input and output ports of the switch and route the message therebetween. Once the link is established, the message is routed through the cross-point matrix, typically on a bit- or byte-serial basis, from the originating input port to the destination output port. The routing code for this particular switch is simply removed from the message and discarded by the circuitry in the destination output port of the switch. The remainder of the routing code is that which will be used to route the message through successive downstream switches in the network. Once the message is fully routed through the switch, the cross-point connections are reset to collapse, i.e. tear down, the link then existing between the input and output ports. The error correcting code field contains a value obtained by processing the information field through a predetermined error correcting polynomial, such as a known cyclic redundancy code (CRC), to yield a resulting value. Once the message has been routed through the switch, the information field is processed within the destination output port to reconstruct this value. The reconstructed value is then compared with the value contained within the trailing field. If the two code values match, then the message has been transported without error through the switch and can be subsequently routed through the next successive switching stage in the network. Alternatively, if a match does not occur, then the message that arrived at the destination output port contains an error. As such, control circuitry within the switch as well as higher level supervisory control circuitry within the network usually requests that this particular message be discarded and a new message containing the corresponding information be re-transmitted through the network.

As described thus far, this architecture generally functions well if a destination output port on a cross-point based switch is always available to accept a message then situated at an originating input port. However, this availability can not be guaranteed during periods of heavy message traffic. In fact, if the destination output port is then busy and can not accept the message then situated at an originating input port, this message generally waits at the input port, until the output port becomes available, before being routed through the cross-point matrix. In cross-point based switches known in the art, each input port contains a first-in first-out (FIFO) queue to store incoming messages that are to be routed through that port. Though not particularly relevant here, the FIFO queue, by providing input buffering, permits the upstream circuitry and the cross-point switch to operate at different speeds. Messages move through the queue on a serial time ordered basis: the first message entered into the queue reaches the output of the queue and hence is routed through the cross-point matrix before the next successive message in the queue and so forth for all messages then stored in the queue. Unfortunately, if a message at the head of the queue is stalled, due to the unavailability of its destination output port, all successive messages in the queue can not advance through the cross-point matrix. This, in turn, stalls all the messages then residing in the queue. As such, all the messages then stored within this input port are blocked and can not be routed until the message at the head of the queue can be routed. This condition is referred to as "input blocking". Input blocking: can become significant during peak traffic loads and hence greatly reduce the throughput of the switch at these times.

Cross-point based packet switches that contain input queues and thus may likely experience significant input blocking are shown in the following U.S. Pat. No. 5,140,582 (issued to M. Tsuboi et al. on Aug. 18, 1992); U.S. Pat. No. 4,947,387 (issued to E. Knorpp et al. on Aug. 7, 1990); U.S. Pat. No. 4,922,488 (issued to G. Niestegge on May 1, 1990) and U.S. Pat. No. 4,752,777 (issued to P. A. Franaszek on Jun. 21, 1988 and assigned to the present assignee hereof). Given the susceptibility of such switches to input blocking, cross-point packet switches that contain input queues are generally not suited for use with high peak traffic loads, and thus have not been appropriate for use in a massively parallel processing environment.

One solution aimed at ameliorating input blocking, and thus increasing message throughput, in an input queue based cross-point switch is described in U.S. Pat. No. 5,371,893 by D. W. Prince et al. and entitled "Look-Ahead Priority Arbitration System and Method", (hereinafter referred to as the "Prince et al. patent") and assigned to the present assignee hereof. In essence, whenever a message at the head of an input queue is stalled, this solution involves determining whether the next successive message in the queue can then be routed to its associated destination output port. If this next message can be routed, it is routed while the message at the head of the queue remains stalled. By routing messages around a blocked message and hence through an otherwise "blocked" input port, this solution significantly increases the throughput through the switch. Unfortunately, this technique disadvantageously increases the complexity of the circuitry used within each input port. Since a packet switch destined for use in a massively parallel processing system typically contains a relatively large number of input ports, the additional complexity of all the input ports may noticeably increase the cost of the overall system. Furthermore, resources that are expended at input buffers tend to be poorly utilized. In this regard, if, at any given moment, an input port is not experiencing blockage (or contention, as discussed below) for a message situated thereat and destined to an output port, the additional resources incorporated into that input port as taught by the Prince et al. patent are essentially wasted and can not be used to alleviate blockage (or contention) that might then occur at some other input port.

Output contention occurs whenever two or more input ports simultaneously contain messages at the heads of their respective queues which are to be routed to the same output port. In essence, both messages are contending for the same output port. The switch must decide which one of these messages is to be routed to the output port while the remainder of these messages wait to be routed during a subsequent switching cycle. Inasmuch as various techniques now appear to exist in the art to rapidly resolve output contention, such as within a single clock cycle or concurrently with other tasks inherent in routing a message through a packet switch, output contention resolution no longer appears to be a major factor in limiting the performance of a packet switch, including those destined for use in, e.g., a massively parallel processing environment. In the context of various high speed contention resolution techniques applicable to packet switches designed for asynchronous transfer mode (ATM) switching, see, e.g., U.S. Pat. No. 5,179,55 (issued to H. J. Chao on Jan. 12, 1993) and U.S. Pat. No. 5,157,654 (issued to A. Cisneros on Oct. 20, 1992).

Thus, a general need has existed in the art for a packet switch, particularly one suited for use in a massively parallel processing system, that does not appreciably suffer, if at all from input blocking. Such a switch should also not be unduly complex or costly to implement. In addition, while such a switch would likely require additional resources to ameliorate input blocking, those resources should be used as efficiently as possible and preferably not be dedicated only to a particular input port(s). If such a switch were to be incorporated into a packet network within a massively parallel processing system, the overall throughput of the system should dramatically and cost effectively increase over that heretofore possible in the art thereby advantageously increasing the attractiveness of using such a system in a given processing application.

One such packet switch which was developed by the present assignee and appeared to meet these needs is disclosed in M. Denneau et al., "The Switching Network of the TF-1 Parallel Supercomputer", *Supercomputing,* Winter 1988, pages 7–10. In essence, this packet switch relies on using a number of inter-connected single chip integrated circuit 8-by-8 time divisional uni-directional packet routers. Each of these routers contains eight identical input port circuits (receivers) and eight identical output port circuits (transmitters). Each of the receivers performs four major functions: administering a channel flow-control protocol buffering incoming messages using a 16-byte internal queue deserializing incoming messages into 8-byte message portions (hereinafter referred to as "chunks") and decoding message routing information. From each receiver and in the event of contention for a given output port, the 8-byte chunks destined therefor are sent to a central queue. This queue implements a buffered time-multiplexed 8-way router. The queue accepts one message chunk from each receiver on a first-come first-served basis per clock cycle. The central queue is composed of 128 8-byte locations all of which are shared and dynamically allocated according to demand then existing. The central queue stores all of the message chunks, until the corresponding transmitter becomes available, at which point the chunks are sent thereto. Within the central queue, the stored messages are organized into eight linked lists with each list associated with a different transmitter. The eight transmitters, one used for each output port, are served by the central queue on a first-come first-serve basis. As long as chunks are available within the central queue, one of these transmitters is served each clock cycle. Each transmitter accepts message chunks from the central queue, serializes these chunks, buffers the resulting serial information in a 16-byte output queue and then transmits the resulting buffered information to an output channel in accordance with the channel flow control protocol. The router chip also incorporated byte-serial by-pass channels which, whenever an output port is not experiencing any contention, permits messages to pass directly from the receivers to the transmitter for this port with very low latency. Advantageously, use of such a central queue substantially, and generally totally, eliminates blocking, i.e., a message packet at any input port which can not be routed due to the unavailability of its corresponding output port would not block other message packets then queued at the same input port. Furthermore, since the central queue is shared by all the input ports, its utilization tends to be much higher than input port resident buffering schemes.

While this packet switch provided excellent performance in packet routing, it suffered various limitations which, in practice, limited its use in a massively parallel processing system. First, the router chip and a packet network fabricated of these chips is uni-directional in nature. Consequently, it is oftentimes not readily possible to operate a desired portion, e.g., one or more but not all processing racks, of a massively parallel processing system that has such a packet network with a uni-directional topology without having to disconnect and appropriately re-arrange cables that inter-connect these chips. This, in turn, requires that the entire system be brought "down" in order to upgrade and/or maintain, e.g., test and/or repair, a given portion of the system and then, if necessary, re-cabled accordingly to restore some operative processing capability. Needless to say, this not only adversely affects the processing throughput of the system but also imposes a heavy and unnecessary burden on the system personnel. In contrast, a massively parallel processing system constructed with a bi-directional topology can be readily modularized, with any module(s), such as processing rack or portions thereof, being easily upgraded and/or repaired without any need for re-cabling. However, bi-directional topologies are susceptible to deadlock. Specifically, if, for any transmitter sending to a receiver, the corresponding queues on each of the associated router chips, both in the FIFOs in the individual port circuits as well as in the central queues thereof, are each filled with opposing traffic, e.g., all the message chunks on one such FIFO are to be routed in a direction opposite to that of the traffic in the corresponding FIFO, none of this traffic can move. As such, a deadlock condition occurs which then completely prevents any packets from moving between these ports, thereby significantly reducing and possibly halting application processing at the system. Since instantaneous traffic loads can be quite high in a massively parallel processing system, a significant likelihood exists that deadlock with an attendant reduction and/or halt in application processing will occur in a system having a bi-directional topology.

Commonly assigned U.S. Pat. No. 5,546,391 by Hochschild et al., entitled "Central Shared Queue Based Time Multiplexed Packet Switch With Deadlock Avoidance," which is hereby incorporated herein by reference in its entirety, describes a packet switch containing input ports and output ports inter-connected through two parallel paths, i.e., a multi-slot central queue and a low latency by-pass crosspoint switching matrix. The central queue has one slot dedicated to each output port to store a message portion ("chunk") destined for only that output port with the remaining slots being shared for all the output ports and dynamically allocated thereamong, as the need arises. Only those chunks which are contending for the same output port are stored in the central queue; otherwise, these chunks are routed to the appropriate output ports through the cross-point switching matrix. Each receiver classifies its resident chunks (as critical or non-critical) based upon both the urgency with which that chunk must be transmitted to its destination output port and by the status of the central queue. A critical chunk, i.e., one that must be transported as soon as possible to an output port is stored within the dedicated slot of the central queue for that particular output port. Non-critical chunks are stored within available shared slots in the central queue.

Although the Hochschild et al. patent describes a packet switch with enhanced performance over the approaches described above, there remains a continuing need to further enhance performance of the packet switch, particularly for use in connection with a massively parallel processing system. The present invention is directed to providing such a further performance enhancement.

DISCLOSURE OF THE INVENTION

Briefly summarized, the present invention comprises in one aspect a method for forwarding a data packet within a packet switch having an input port, an output port, and a bypass path and a central queue path coupled in parallel between the input port and output port. The method includes: dividing the data packet into a sequence of multiple portions; forwarding the sequence of multiple portions from the input port to the output port through the central queue path; during the forwarding, determining that one portion of the multiple portions of the sequence comprises a critical portion; and switching forwarding of the sequence of multiple portions from the input port to the output port to the bypass path, the switching resulting in passing of the critical portion from the input port to the output port through the bypass path irrespective of whether contention exists for the output port.

In another aspect, a system is provided herein for forwarding a data packet within a packet switch having an input port, an output port, and a bypass path and a central queue path coupled in parallel between the input port and the output port. The system includes means for dividing the data packet into a sequence of multiple portions and means for forwarding the sequence of multiple portions from the input port to the output port through the central queue path. The system further includes means for determining that one portion of the multiple portions comprises a critical portion and means for switching forwarding of the sequence of multiple portions from the input port to the output port to the bypass path, the switching resulting in passing of the critical portion from the input port to the output port through the bypass path irrespective of whether contention exists for the output port.

In still another aspect, a packet switch is provided herein having multiple input ports and multiple output ports with a central queue path and a bypass path coupled in parallel therebetween. The packet switch also includes data packet flow control circuitry coupled to the multiple input ports and the multiple output ports for controlling transfer of a data packet from at least one input port to at least one output port. The data packet control circuitry is adapted to forward a sequence of multiple portions of the data packet from the at least one input port to the at least one output port through the central queue path, and to identify during the forwarding a next portion of the multiple portions of the sequence as a critical portion to the at least one output port, and in response thereto, to switch forwarding of the sequence of multiple portions of the data packet from the central queue path to the bypass path so that the critical portion is passed directly from the at least one input port to the at least one output port through the bypass path irrespective of whether contention exists for the at least one output port.

In a further aspect, the invention comprises an article of manufacture including a computer program product comprising computer usable medium having computer readable program code means therein for use in forwarding a data packet within a packet switch having an input port, an output port, and a bypass path and a central queue path coupled in parallel to the input port and the output port. The computer readable program code means in the computer program product includes: computer readable program code means for causing a computer to effect dividing the data packet into a sequence of multiple portions; computer readable program code means for causing a computer to effect forwarding the sequence of multiple portions from the input port to the output port through the central queue path; computer readable program code means for causing a computer to effect determining during the forwarding that one portion of the multiple portions of the sequence comprises a critical portion; and computer readable program code means for causing a computer to effect switching forwarding of the sequence of multiple portions from the input port to the output port through the bypass path, the switching resulting in passing the critical portion from the input port to the output port through the bypass path irrespective of whether contention exists for the output port.

Advantageously, a switch network implemented in accordance with principles of the present invention eliminates any need for dedicating one (or more) data slots in the central queue for each output port. Therefore, all space within the central queue is able to be shared among the output ports. Performance simulation of switch networks indicates that the more shared buffering available, the better the overall switch network performance.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

After considering the following description, those skilled in the art will clearly realize that the teachings of this invention can be readily utilized in any bi-directional packet network to substantially prevent deadlock from occurring. Currently, digital, and particularly packet based, bi-directional communication systems are finding increasing use in a wide range of applications stretching from, for example, public and private computer networks (e.g. local, wide or metropolitan area networks), to telephonic, and specialized communications applications such as the communication backbone of a massively parallel processing system. Inasmuch as the many bi-directional packet networks known in the art (regardless of their end use), and particularly bi-directional packet switches used therein, may often be susceptible to deadlock, this invention will find ready application in any of these switches to dramatically improve its traffic handling capacity and hence generally improve the performance of the system in which that switch is used. Nevertheless, to simplify the following discussion, the present invention is specifically described below in the context of use within a bi-directional packet switch that facilitates inter-processor communication in a scalable parallel processing system. Such a system can be readily scaled upward to a size that is synonymous with what is commonly referred to as a massively parallel processing system.

Figure 1:
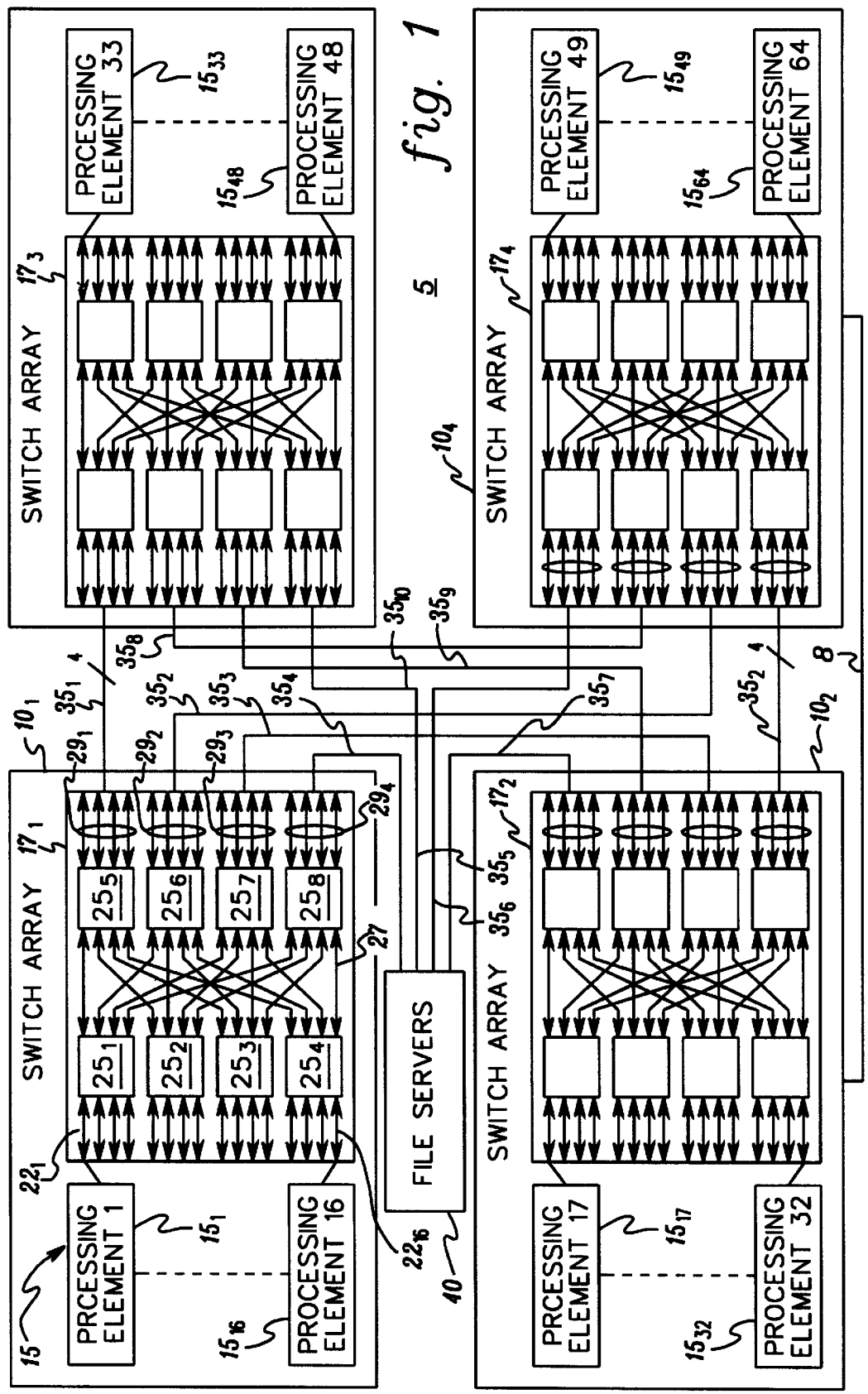
FIG. 1 is a block diagram of a scalable parallel processing system 5 to employ the principles of the present invention.

FIG. 1 depicts a high level block diagram of a scalable parallel processing system 5 that incorporates the teachings of the present invention. This system is the 9076 SP1 system which is commercially available from International Business Machines (IBM) Corporation of Armonk, N.Y. which is also the present assignee hereof.

To the extent relevant, system 5 is configured as containing sixty-four separate processing elements 15. All of these processing elements operate in parallel with each of these elements performing a distinct portion of a given application. In order for each of these elements to perform its individual processing task, that element communicates with other processing elements through high speed bi-directional packet network 8, and specifically transfers application data through packet messages with other such elements, as the application requires. In that regard, each processing element undertakes its associated application processing upon receipt of the needed data from other processing elements and then communicates the results of that processing onward to another processing element(s), again by packet messages, for subsequent use therein, and so on.

As shown, system 5 is organized into four separate processing clusters, each of which contains sixteen separate processing elements 15 connected to corresponding nodes of a 16-by-16 bi-directional packet switch array. Specifically, processing clusters $10_1, 10_2, 10_3$ and $10_4$ contain switch arrays $17_1, 17_2, 17_3$ and $17_4$ which are connected to processors $15_1, \ldots, 15_{16}; 15_7, \ldots, 15_{32}; 15_{33}, \ldots, 15_{48};$ and $15_{49}, \ldots, 15_{64}$, respectively. All four packet switch arrays $17_1, 17_2, 17_3$ and $17_4$ are themselves interconnected through leads 35 to implement packet network 8. In that regard, arrays $17_1$, and $17_2, 17_1$, and $17_3, 17_1$, and $17_4, 17_2$ and $17_4$, and $17_3$ and $17_4$ are interconnected through respective leads $35_3, 35_1, 35_2, 15_{11}$ and $15_8$. In addition, file servers 40, which are conventional and well known in the art, are coupled, for packet communication, through leads 35, specifically leads $35_4, 35_5, 35_6$ and $35_7$ to the switch arrays within respective processing clusters $10_1, 10_3, 10_4$ and $10_2$ in order to write (download) a desired file(s) into any processing element for subsequent use thereat or to receive (upload) and subsequently store a file(s) from any processing element.

Inasmuch as all of the processing clusters are identical, then, for purposes of brevity, the following discussion will only address cluster $10_1$. This cluster contains sixteen separate processing elements, all of which are identical. Each of these processing elements is microprocessor based and specifically contains a reduced instruction set (RISC) microprocessor, such as preferably a RISC System/6000 type microprocessor manufactured by the IBM Corporation, and associated memory, input/output (I/O) and supporting circuitry. Since the circuitry of each of these elements has essentially no bearing on the invention and is conventional and certainly readily apparent to anyone skilled in the art, each of these elements will not be discussed in any greater detail.

Each processing element, such as illustratively elements $15_1$, and $15_{16}$, can communicate on a bi-directional basis through bi-directional switch array $17_1$, and hence through packet network 8 with any other such element or the file servers. In doing so, each of these elements is connected through a pair of half-duplex links to a corresponding input port (also hereinafter referred to as a "receiver") of an 8-by-8 port bi-directional switching circuit located within this switch array. Switch array 17, contains eight separate identical 8-by-8 switching circuits 25 (specifically circuits $25_1, 25_2, 25_3, 25_4, 25_5, 25_6, 25_7$ and $25_8$) inter-connected through leads 27. Each of these switching circuits, which will be described in considerable detail hereinbelow, routes packets from any of eight input ports to any of eight output ports. As such, the inter-connected switching circuits situated within switch array 17, implement a bi-directional 16-by-16 packet switch. Our invention resides within each of the switching circuits. To simplify the drawing, each pair of half-duplex lines that connects to each processing element is shown as a single full-duplex line, such as lines $22_1$ and $22_{16}$ that respectively link processing elements $15_1$ and $15_{16}$ to switching circuits $25_1$ and $25_4$.

Operationally speaking, each processing element, such as element $15_1$, that desires to send a packet (i.e., an "originating" element) to another processing element (i.e., a "destination" element), such as element $15_{33}$, first assembles the packet, to contain appropriate fields, principally: a header containing a one byte (eight-bit) length field and a routing code field, followed by a variable length data field which, in turn, is itself followed by a trailer field containing various delimiters. The entire packet (also referred to herein as a "message") is limited to a maximum of 255 by tesin length. The length field specifies the length of the entire packet, in bytes. The routing code is formed of a number of successive groups of three-bit values, packed two groups per byte, with each group designating an output port address within a given 8-by-8 switching circuit. In practice, a number of such switching circuits are serially connected to implement successive routing stages. The number of such three-bit groups is governed by the number of successive routing stages, i.e., successive inter-connected individual switching circuits, used within the network. As each packet is routed through a given stage and as discussed in detail below, that stage examines the most significant three-bit group to discern the specific output port for that packet and then discards this group and shortens that packet accordingly. Accordingly, the next three-bit group becomes the most significant group for use by the next successive routing stage, and so forth. The data is a variable length field of application data provided by an application executing at the origination processing element and destined for use by a destination processing element.

Figure 2:
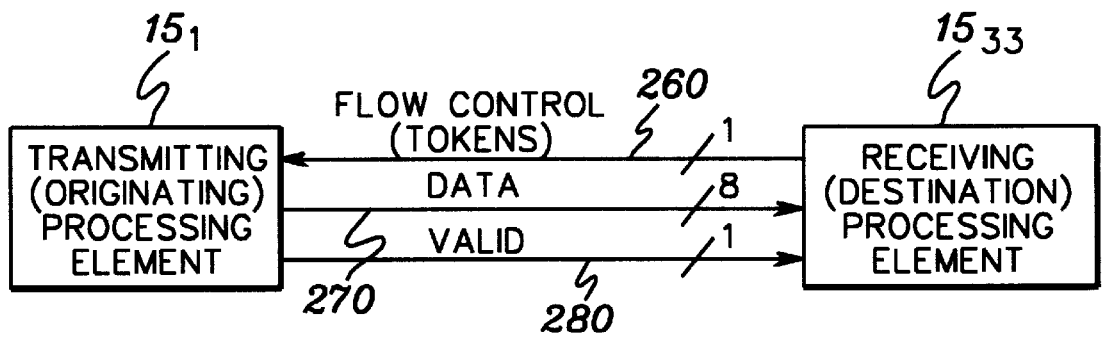
FIG. 2 depicts a simplified block diagram of a flow control and communication protocol used for inter-processor communication that occurs within system 5 shown in FIG. 1.

FIG. 2 depicts a simplified block diagram of a token based flow control and communication protocol used for inter-processor communication within system 5 shown in FIG. 1.

Specifically as shown in FIG. 2, ten leads carry communication between a transmitting, i.e., originating, processing element (or other switching circuit), here shown as illustratively element $15_1$, and a receiving, i.e., destination, processing element (or other switching circuit), here illustratively element $15_{33}$. Eight-bit leads 270 carry byte serial data, i.e., one message byte at a time per clock cycle. Single-bit lead 280 carries a data valid signal which indicates, through a high level, the presence of a valid signal on leads 270.

Although system 5 shown in FIG. 1 is a clocked synchronous system (the clock signals are not explicitly shown), the propagation delay of the protocol signals, shown in FIG. 2, from one end of the network to the other can exceed the clock period. Accordingly, a token based flow control methodology is used to provide an effective flow control mechanism. Hence, single-bit lead 260, shown in FIG. 2, carries a token signal which can be simplistically viewed as a single bit signal traveling across this lead. This signal, which is directed in the reverse direction as the data flow over leads 270, when received, represents a right of its recipient, here element $15_1$, to send another byte of data. In particular, and as discussed below, transmitting element $15_1$, contains an internal token counter which, at system initialization, is preset to contain a specific number of tokens, typically "31". Whenever that element sends a message byte across leads 270, the token count at this element is decremented by one. Whenever receiving element $15_{33}$ is willing to accept another message byte from this transmitting element, the former element sends a token back across lead 260 to increment the token count at the latter element. The transmitting element can only send message bytes if its internal token counter contains a non-zero count. Once the count reaches zero, the transmitter is inhibited from sending any further bytes until its token count is appropriately changed. For error detection purposes, the token signal, in practice, is encoded as a two-bit serial signal: "01" defines zero tokens and "10" defines two tokens. As such, every other clock cycle, receiving element 1533 can decide to send either zero or two tokens to transmitting element $15_1$. Essentially identical token based flow control operations occur within receiving element $15_{33}$ to control the number of bytes that element can receive. Here, each token impinging upon the receiving element and stored within its internal token counter represents the right of that particular element to receive another message byte.

Figure 3:
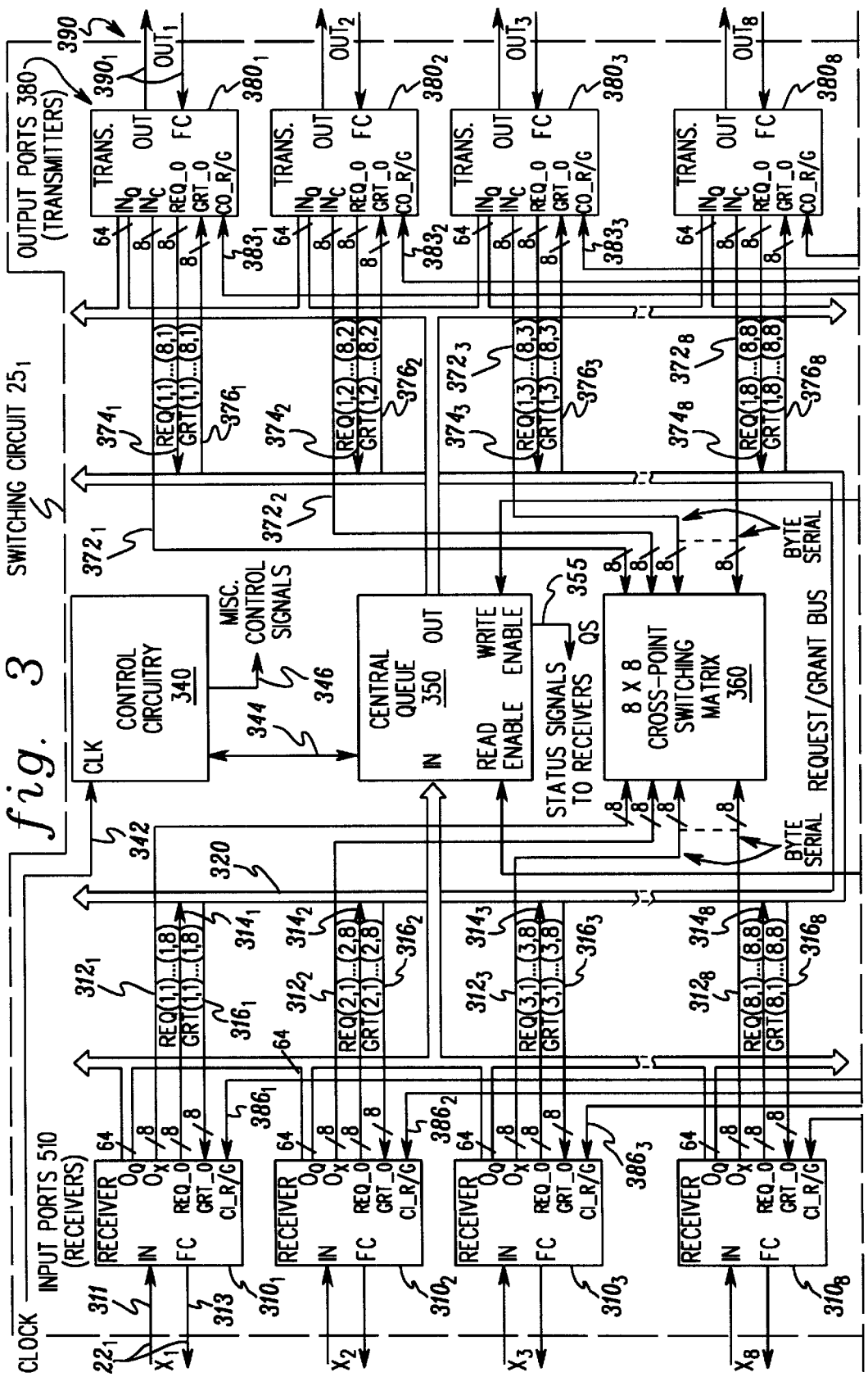
FIG. 3 is a block diagram illustrating a switching circuit $25_1$ situated within system 5 shown in FIG. 1.

With the above in mind, a block diagram of the switching circuit, illustratively circuit $25_1$ and which is situated within system 5 shown in FIG. 1, is depicted in FIG. 3. To simplify the drawing and to enhance reader understanding, all input ports (receivers) are shown on the left side of FIG. 3 and all output ports (transmitters) are shown on the right side. In actuality to implement bidirectional communication for each processing element connected to the switching circuit, that element is connected to both an input port and an output port of the same switching circuit. Furthermore, although the switching circuit is illustratively embodied within an 8-by-8 packet router, the present invention can be readily used within nearly any size packet switch (router) to avoid deadlocks.

As shown, switching circuit $25_1$ contains eight identical input port circuits (receivers) $310_1, 310_2, 310_3, \ldots, 310_8$, all of which collectively form receivers 310; eight identical output port circuits (transmitters) $380_1, 380_2, 380_3, \ldots, 380_8$, all of which collectively form transmitters 380; central queue 350; and cross-point switching matrix 360. Each of receivers 310, such as receiver $310_1$, is connected, through the ten-lead token based protocol arrangement described above in connection with FIG. 2, via associated leads, such as leads $22_1$, to a corresponding processing element, such as processing element $15_1$. Of these ten leads, for simplicity, the eight-bit data leads and the single-bit valid lead are collectively shown as a common input (IN) lead, such as lead 311. The token (flow control-FC) lead is shown as separate single-bit lead 313. Each of these receivers, to the extent relevant, performs four major functions as discussed in detail below: administering the channel flow-control protocol, buffering incoming messages using an internal queue, deserializing incoming messages into 8-byte message portions (hereinafter referred to as "chunks") and decoding message routing information. Each processor is responsible for fully assembling a packet, including embedding appropriate header and trailer information, prior to supplying that packet to the companion receiver. Based upon contention, message chunks are then directed from the associated receivers along either of two paths. If the destination output port for that chunk is then available and hence not experiencing any contention, that chunk is immediately routed through cross-point matrix 360 to effectuate a very low latency packet transfer. Alternatively, if there is traffic in the central queue contending for routing to the same output port, then that chunk is written into a corresponding 64-bit slot within the central queue. The packet is thereafter transferred out of the central queue to its destination output port circuit when that circuit once again becomes available. Central queue 350 is dual-ported and contains 128 64-bit locations, each of which can store a message chunk. Since both the central queue and the cross-point switching matrix can route packets to the same destination output port circuit, cross-point switching matrix 360 forms a so-called "by-pass" path around the central queue.

To transfer a message chunk from any receiver into the central queue, each receiver has a separate eight-byte output (labeled $0_Q$) which is connected, via 64-bit bus 315, to a 64-bit data input (labeled IN) on central queue 350. Similarly, to transfer a chunk from the central queue to any transmitter, the central queue has a 64-bit output (labeled OUT) which is connected, via bus 370, to a 64-bit input of each of the transmitters. Chunks are supplied to and written from the central queue on a time-multiplexed basis, with each receiver supplying its associated chunk during a corresponding clock cycle and each transmitter obtaining a message chunk destined therefor during its associated corresponding clock cycle. As long as chunks are situated within corresponding receivers for subsequent routing or are situated in the central queue and awaiting delivery to a destination transmitter, one of these receivers and one of these transmitters is served each clock cycle, with the receivers being independently served apart from the transmitters.

In order to determine whether an output port circuit is experiencing contention and thus whether a message chunk can, for example, be routed through cross-point switching matrix 360, each receiver issues a request signal to the destination transmitter. The destination transmitter, as will be discussed in detail below, contains an arbiter which arbitrates the status of eight request signals, one from each receiver, and determines which of the receivers, if any, is then to be granted permission to send its message chunk through the cross-point switch to that output port. Specifically, each of the receivers issues eight request (REQ) signals, and particularly one to each transmitter. In this regard, receiver $310_1$ issues eight separate request signals $REQ_{(1,1), \ldots, (1,8)}$ which, via eight-bit leads $314_1$ and request/ grant bus 320, feed the first receiver request input of each of the eight transmitters, i.e., $380_1, 380_2, 380_3, \ldots, 380_8$. If a message chunk situated at this receiver is destined for first transmitter $380_1$, then this particular receiver asserts the request signal for this particular transmitter, and so forth for messages destined for each of the other transmitters. All eight request signals for this particular transmitter originating from the first request signal issued by each of the eight receivers are collectively routed to this transmitter, via leads $374_1$. To facilitate understanding, the request and grant signals, e.g., $REQ_{(1,8)}$ carry sub-scripts wherein the first sub-script denotes the index of the specific originating receiver, here receiver $310_1$, and the second sub-script denotes the index of the specific destination transmitter, here illustratively transmitter $380_8$. Similarly, each of the other receivers issues eight separate request signals $REQ_{(2,1)}, \ldots, {(2,8)}; REQ_{(3,1)}, \ldots, {(3,8)}; \ldots, REQ_{(8,1)}, \ldots REQ_{(8,8)}$ which are connected, through eight-bit leads $314_2, 314_3, \ldots, 314_8$, bus 320 and leads $374_2, 374_3, \ldots, 374_8$, to the same corresponding request inputs of all eight destination transmitters, respectively. Based upon the status of the eight request signals applied to the arbiter within each transmitter and the arbitration scheme used therein (specifically least recently used, as described below), the arbiter at that transmitter grants permission to one of the receivers, by asserting its associated grant signal thereto, to then transmit a message chunk through the cross-point switching matrix to this transmitter. To do so, each transmitter supplies eight grant signals, with one of these grant signals being connected to the same corresponding grant signal input on each receiver. In this regard, transmitter $380_1$ supplies eight grant signals ($GRT_{(1,1)}, \ldots, _{(8,1)}$), via leads $376_1$ and bus 320. Each of these particular signals is routed to the first grant signal input of each receiver. Similarly, the grant signals ($GRT_{(1,2)}, \ldots, _{(8,2)}; GRT_{(1,3)}, \ldots, _{(8,3)}; \ldots GRT_{(1,8)}, \ldots, _{(8,8)}$) issued by each of the other transmitters, are connected by corresponding leads $376_2, 376_3, \ldots, 376_8$, bus 320 and leads $316_2, 316_3, \ldots, 316_8$ to corresponding grant signal inputs of each of the receivers. In response to the particular grant signal being asserted at a given receiver, that receiver then routes its current message chunk, in eight-byte serial fashion, onward, via output leads ($O_x$) into cross-point switching matrix 360. Receivers $310_1, 310_2, 310_3, \ldots, 310_8$ are connected, via 8-bit leads $312_1, 312_2, 312_3, \ldots, 312_8$, to corresponding byte-serial inputs of the cross-point switching matrix. Separate byte-serial outputs of this switching matrix are connected through leads $372_1, 372_2, 372_3, \ldots, 372_8$ to corresponding byte-serial inputs of transmitters $380_1, 380_2, 380_3, \ldots, 380_8$. Inasmuch as switching matrix 360 is of conventional design, it will not be discussed in any greater detail.

Those message chunks that are experiencing contention are routed into available 64-bit slots within central queue 350, pending subsequent availability of the destination transmitters. This queue implements a buffered time-multiplexed 8-way router. Within the central queue, the stored messages are organized into eight linked lists with each list being associated with a different transmitter.

Each of transmitters 380, specifically transmitters $380_1, 380_2, 380_3, \ldots, 380_8$, as described in detail below, performs several functions. Specifically, each transmitter accepts message chunks, in time-divisional fashion and in 64-bit parallel form, from the central queue, serializes these chunks, buffers the resulting serial information in an output queue and then transmits the resulting buffered information, as a byte-serial bit stream, to an output channel in accordance with the ten-bit token based flow control protocol. Each transmitter also accepts message portions in byte-serial fashion that have been routed through cross-point switching matrix 360 and properly multiplexes these byte-serial portions into the byte-serial bit stream for the associated output channel. Through the ten-bit protocol, each transmitter produces byte-wise serial data on eight data leads and a valid data signal on a separate one-bit lead. For simplicity, all these nine leads are shown as a single common lead (OUT). The associated flow control lead is shown as a separate lead (FC). All these output leads collectively form leads 390 with those leads supplied by illustratively transmitter $380_1$ being leads $390_1$.

Control circuitry 340, which is conventional logic and finite state machine circuitry, generates various control and clock signals to properly control the operation of switching circuit $25_1$. These control signals are typified by appropriate clock and timing signals applied, via leads 344, to central queue 350 and, via leads 346, to other components of this circuit. An external source of clock pulses is applied over lead 342 as an input to control circuitry 340. Inasmuch as all these clock and control signals would be readily apparent to anyone skilled in the art and to simplify the drawing, none of these particular signals is shown or described in any greater detail.

As taught in the art, specifically M. Denneau et al, "The Switching Network of the TF-1 Parallel Supercomputer" Supercomputing, Winter 1988, pages 7–10, central queue 350 contains 128 8-byte locations all of which would be shared and dynamically allocated according to demand then existing. Furthermore, the receivers and transmitters are served on a first-come first-served basis.

We have determined that if such a switching circuit with a completely shared central queue were to be used to implement a bi-directional packet network in a massively, or even scalable, parallel processing system, then that network would be susceptible to experiencing deadlocks. A deadlock, when it occurs, would completely throttle traffic from moving through the network and effectively prevent application processing from proceeding, thereby significantly reducing the throughput of the processing system.

Advantageously, the present invention comprises a switching circuit, predicated on that described above, that advantageously avoids deadlock when used in a bi-directional packet network.

In accordance with the teachings of the above-incorporated U.S. Pat. No. 5,546,391, the central queue, rather than having all its 8-byte slots shared among all the output ports, is apportioned to contain one (or more) slots that is dedicated (reserved) to each output port with all the remaining slots being shared among all these ports. In one embodiment, one slot is dedicated to each output port with the remaining 120 slots being shared by all these ports. In addition, each of the receivers appropriately classifies each message chunk that is then to be routed to a destination transmitter based upon its current need at that transmitter, i.e., whether that chunk is "critical" in the sense that this chunk must be routed as soon as possible to the transmitter or "non-critical" in the sense that this chunk can wait, and whether the shared portion of the central queue is currently full or not. If the current message chunk is critical, regardless of whether the shared portion is full or not, that chunk is unconditionally stored in the dedicated slot, of the central queue, for the corresponding transmitter. Once this transmitter becomes available, that chunk is read, during a single clock cycle, from this slot into this transmitter. Inasmuch as one slot is always dedicated to each output port and only one chunk can be critical at any one time, the current message chunk can be accommodated regardless of the status of the shared portion of the queue. Alternatively, if this message chunk is non-critical and the shared portion of the central queue is not full, i.e. a shared slot(s) is then available to store that message chunk, a request is made by the receiver to an arbiter to determine whether, in view of similar requests then being made by all the other receivers, this chunk is to be stored in the shared portion of the central queue. Arbitration is conducted on a least recently used basis, i.e., the receiver that was not serviced for the longest time becomes the next one to be serviced. If the chunk is non-critical but the central queue is full, the associated receiver does not make such a request. Arbitration is also conducted, in response to requests made by the transmitters, to extract stored message chunks, if any exist from the shared portion of the central queue that are destined for these transmitters. This arbitration is also conducted on a least recently used basis. Advantageously, separate arbitration is used to control access into and from the central queue. Though utilizing the same least recently used methodology, these arbitrations function separately and totally independently of one another to assure the requisite fairness among all the input and output ports then separately vying for write or read access, respectively, to the central queue.

Figure 4:
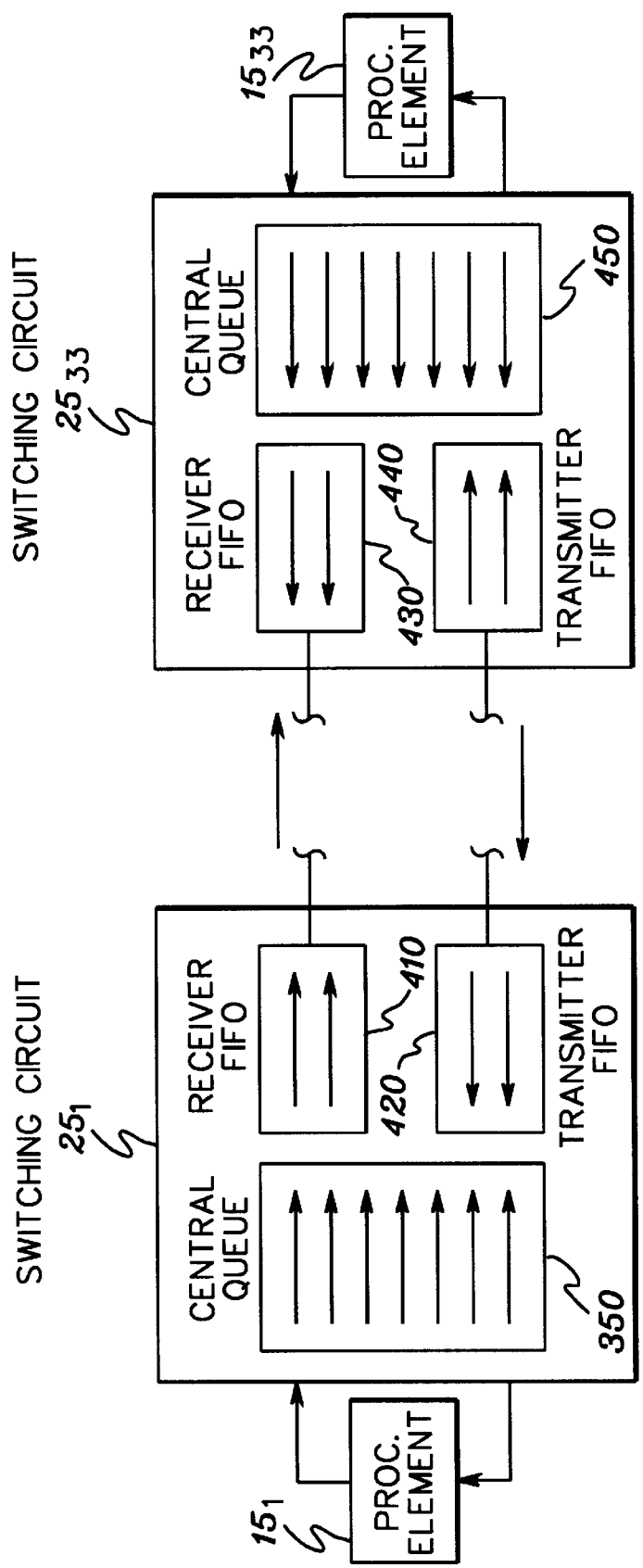
FIG. 4 diagrammatically depicts a deadlock condition.

To fully understand the impact of deadlock, FIG. 4 illustrates a deadlock condition.

FIG. 4 depicts two illustrative switching circuits $25_1$ and $253_{33}$, within system 5, that are situated on opposite ends of an inter-processor communication channel. Processing elements $15_1$ and $15_{33}$ are respectively connected to circuits $25_1$ and $25_{33}$ in order to bi-directionally transfer message packets therebetween. Deadlock arises if, during the course of system processing, all the message storage locations become full in such a manner as to block any further message transfers. This can occur, as shown in FIG. 4, when each one of two corresponding memory portions of both switching circuits (central queues 350 and 450, and internal receiver FIFO (first-in first-out) queues 410 and 430, and transmitter FIFO queues 420 and 440) is totally full with traffic that is heading in an opposing direction to the traffic then stored in the other corresponding memory portion, i.e., central queue 350 is completely full with message traffic headed to the right while central queue 450 is completely full with message traffic headed to the left. With this condition, there is simply no space within any receiver FIFO queue to accommodate another incoming message chunk nor is there any space available in any central queue into which a message chunk can be transferred from this receiver FIFO queue. As such, and also in the absence of space within a destination output port into which a message chunk could be transferred from a central queue, no chunks are transmitted. This condition will persist indefinitely until a storage location (slot) in any one FIFO or a central queue is freed. In the absence of freeing such a slot, inter-processor data flow halts which, in turn, halts any further application processing. Given the heavy traffic loads that occur in a bi-directional packet network used within a scalable, let alone a massively, parallel processing system, deadlocks can occur rather frequently appropriate measures are taken to eliminate their occurrence.

To substantially, and usually totally, prevent deadlocks from occurring in a bi-directional packet network used in a scalable processing system, illustratively system 5 shown in FIG. 1, central queue 350 of switching circuit $25_1$ contains two types of slots in the above-incorporated U.S. Pat. No. 5,546,391: eight dedicated slots in which each output port has a dedicated slot into which a message chunk can be stored for transfer to that port; with the remaining 120 slots being shared among all output ports and dynamically allocated for use by any of the output ports based upon current traffic needs. Second, to route a message chunk to the appropriate slot, i.e., either dedicated or shared, in the central queue, each of the receivers contains an appropriate classifier circuit that, based upon the status of that chunk (critical/non-critical) and the status of the central queue (full/not full) either stores that chunk in the dedicated slot in the central queue for the output port to which the chunk is destined or issues a request to store that chunk in a shared slot in this queue. The status of the central queue (QS) is provided by signals appearing on leads 355, shown in FIG. 3 and connected to each of the receivers. In addition, identical separate least recently used arbiters 368 and 385 are used to separately arbitrate access into (write access) and from (read access) the central queue. This permits write and read access involving the central queue to proceed independently of each other. Inasmuch as this access for each direction now occurs on a least recently used (LRU) basis rather than on a first-come first-served time-multiplexed basis as had occurred in the art, each port has a far greater chance of being served at any one clock cycle than has previously occurred. This, in turn, significantly decreases the likelihood that any port will be starved of its traffic owing to bottlenecks that might otherwise arise to a high level of activity at another port. Inasmuch as the switching circuit treats all ports and with priority given to message traffic arising at or intended for the most infrequently used ports, application processing across all the processing elements tends to equalize throughout the entire system, thereby advantageously increasing system throughput.

In order to arbitrate write access into the central queue, each one of receivers 310 (specifically receivers $310_1$, $310_2$, $310_3$, ..., $310_8$) issues a separate central queue write (input) request signal over a corresponding request lead within leads 386 (which respectively contains paired grant and request leads $386_1$, $386_2$, $386_3$, ..., $386_8$) to arbiter 385. In response to the requests then occurring, this arbiter generates a grant signal (GRT_QI), typically by asserting an appropriate logic level on the grant lead within the appropriate paired request and grant leads, back to the receiver then accorded permission to write a memory chunk into the central queue. In response, the appropriate receiver will then write this message chunk onto 8-byte bus 315. In addition, arbiter 385 also generates an enable signal, on leads 389, to signal the central queue to write the message chunk then appearing on bus 315 into this queue and to specify the destination transmitter for this chunk. In response to the value of the enable signal, circuitry within the central queue (not explicitly shown in FIG. 3) selects the particular slot to use to store this particular incoming message chunk and the particular list to which the current message containing this chunk is to be appended. A critical chunk is written into the dedicated slot for the corresponding destination transmitter since that slot will always be available at the time. A non-critical chunk is typically written into the first available shared slot.

Message chunks are stored within the central queue in the form of eight linked lists: one list for each different transmitter. Each list contains all the successive message chunks that have been stored for the corresponding transmitter as well as, whenever the need arises, separate successive messages destined therefor. As each message chunk is stored within the central queue, that chunk is simply added to the tail of the corresponding list with that list being extended accordingly. Conventional circuitry within the central queue maintains an internal table with entries that maintain links between the chunks then stored within the central queue in order to define the eight lists. In response to the read and write enable signals applied to the central queue, this circuitry manipulates the appropriate list and updates the table: either by accessing the chunk stored at the head of the list in the case of a read operation or adding an incoming message chunk to the tail of this list in the case of a write operation, and altering the list structure accordingly.

Similarly, to control read access to the central queue, each one of transmitters 380 (specifically transmitters $380_1$, $380_2$, $380_3$, . . . , $380_8$) issues a separate central queue read (output) request signal over a corresponding request lead within leads 383 (which respectively contains paired grant and request leads $383_1$, $383_2$, $383_3$, . . . , $383_8$) to arbiter 368. In response to the requests then occurring, this arbiter generates a grant signal (GRT_QO) on leads 365 back to the read enable inputs of the central queue. The status of the grant signals specifies the specific transmitter then accorded permission to obtain a stored chunk from the central queue. In response to these grant signals appearing at the read enable inputs, the central queue reads the message chunk situated at the head of the list for that specific transmitter onto 8-byte bus 370, and then deletes this chunk from the list. In addition, to instruct the specific transmitter to read this message chunk from bus 370, the grant signal is also applied, typically by asserting an appropriate logic level on the grant lead within the appropriate paired request and grant leads 383, to this transmitter.

Turning more specifically to the present invention, performance simulations of switch networks indicate that the more shared buffering available, the better the overall switch network performance. Therefore, disclosed herein is an approach for enhancing the amount of shared logic within the central queue by removing the need to dedicate one (or more) chunk worth of space in the central queue for each output port of the switch network. The solution is to implement processing within the switch network which dynamically transfers message portions of a data packet from the shared central queue path to the cross-point switching matrix path, i.e., the bypass path, whenever a critical chunk is encountered and irrespective of any contention at the output port.

Figure 5:
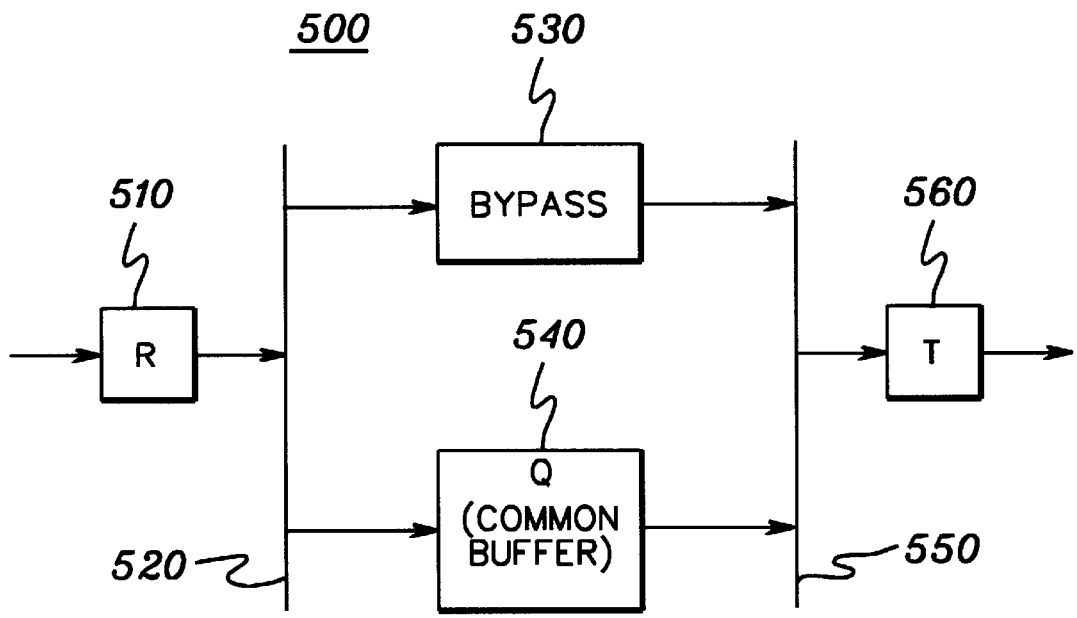
FIG. 5 is a simplified block diagram useful in discussing data packet flow in accordance with the principles of the present invention.

FIG. 5 depicts a simplified view of a central queue-base packet switch, generally denoted 500, in accordance with the principles of the present invention. Packet switch 500 includes multiple receivers 510 each of which is coupled through a shared bus 520 to parallel coupled bypass path 530 and central shared queue path 540. The outputs of the bypass path and the central shared queue path are sent through a second common bus 550 to one or more transmitters or output ports 560 of the packet switch 500. In accordance with the principles of the present invention, a receiver is allowed to request the bypass path when the beginning of a packet is received. If the desired output port is free, the receiver is granted the bypass path giving the data transfer a low latency. However, if the transmit port is busy or cannot transmit data due to back pressure, the receiver writes the data to the central shared queue allowing the transfer to continue. Also, after the receiver is granted the dedicated bypass path, if the output port cannot transmit data, the receiver will be informed of this condition and the receiver changes from using the bypass path to writing the data to the central shared queue. When the receiver starts writing data to the shared queue, the output transmitter is notified and the rest of the packet is forwarded through the central shared queue, and thus, in the prior design of the U.S. Pat. No. 5,546,391, it is necessary to have dedicated slots or emergency slots within the common shared buffer for handling forwarding of a critical chunk to a waiting output port. In accordance with the principles of the present invention, the packet switch is modified to transfer message portions of a data packet from the central shared queue path to the bypass path (i.e., the cross-point switching matrix path) upon detection of a critical chunk of data. By implementing this transition, the need for dedicated space within the central shared queue for handling critical, chunks is eliminated. Therefore, the amount of shared space is increased.

In a switch network implemented in accordance with the principles of the present invention, transfer of data message portions from forwarding through the bypass path to the shared central queue path is accompanied with selective transfer of data message portions from forwarding through the shared central queue path back to the bypass path. This return to the bypass path is used if the receiver starts writing data to the shared queue and stops receiving data before the packet is finished or is unable to keep ahead of the output port due to congestion in the central shared queue. Once the output port has read a last chunk of the data packet that was written to the queue, the central queue controls will signal both the receiver and the output port telling them to change operation and use the bypass path.

Figure 6:
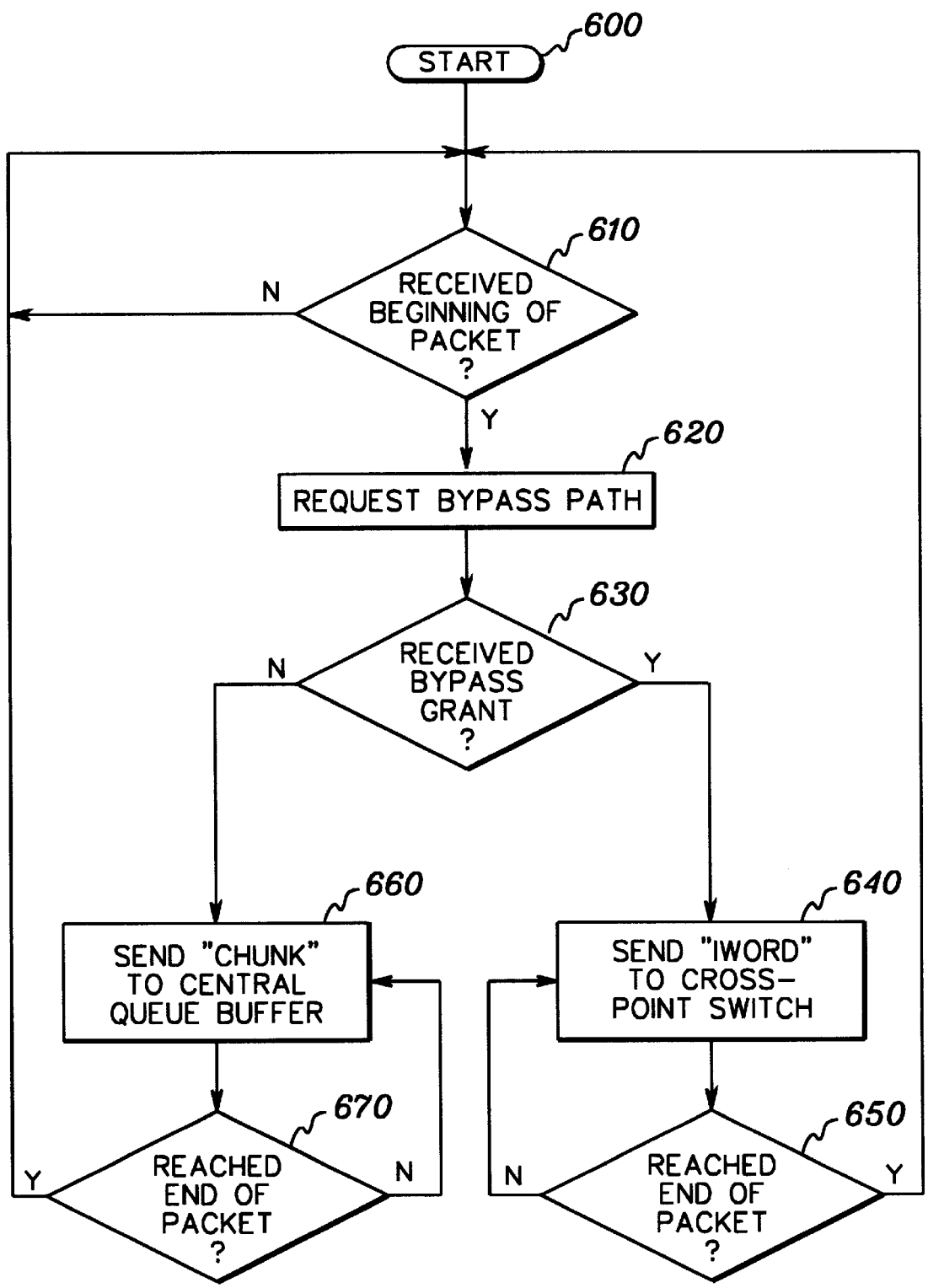
FIG. 6 is a flowchart of conventional data packet forwarding using cross-point switching matrix 360 and central queue 350 of FIG. 2.

FIG. 6 depicts one embodiment of conventional flow control within a central queue-based packet switch. Control starts 600 with receipt of the beginning message portion of a data packet 610. The bypass path is requested 620 and a determination is made whether the bypass path has been granted 630. If "yes", then an "iword" is sent to the cross-point switch (i.e., the bypass path) 640. As used herein, an "iword" comprises a portion of a chunk of data. After sending an iword, the logic determines whether the end of the data packet has been reached 650, and if "no", then the logic continues sending the next iword to the bypass path. Once the end of packet is reached, processing returns to await receipt of a next data packet 610. If the bypass path is not granted, then the message chunk is sent to a central queue path 660 and processing determines whether the end of packet has been reached 670. If "no", then a next chunk in the data packet is forwarded to the central queue path 660 for transfer to the output port, and the process repeats until all message chunks have been forwarded. Once the end of packet is reached, processing returns to await receipt of a next data packet 610.

Figure 7:
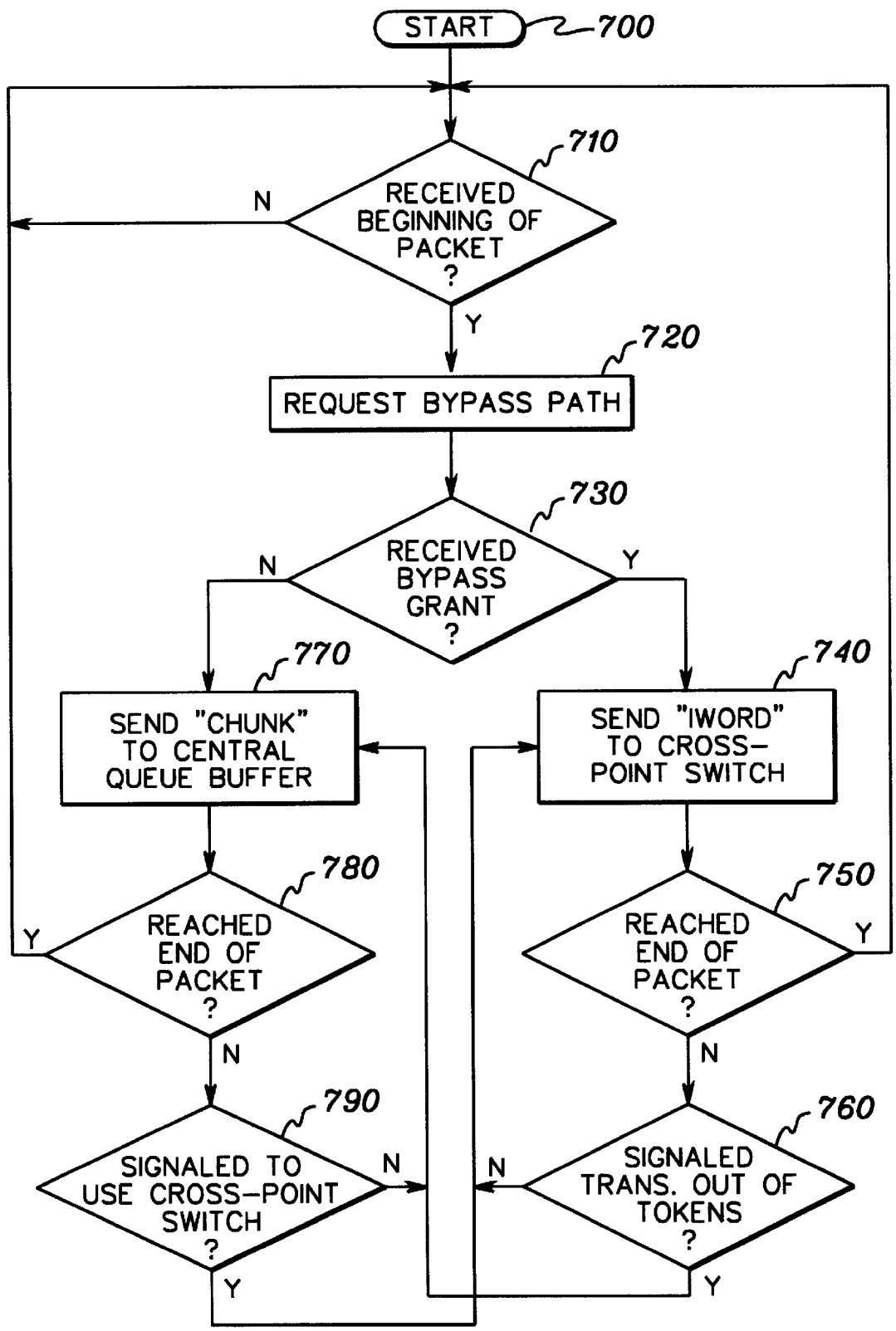
FIG. 7 is a flowchart of data packet forwarding within the switching circuit of FIG. 3 in accordance with the principles of the present invention.

FIG. 7 depicts one embodiment of message data processing in accordance with the principles of the present invention. As shown, in this embodiment there is a dynamic transfer of data chunks from the central queue path back to the bypass path.

Upon starting 700, processing determines whether a beginning portion of a data packet has been received 710. Once the beginning of a data packet is received, processing requests bypass path access 720 and then queries whether the bypass path has been granted 730. If "yes", then a first portion of the data (i.e., an "iword") is forwarded to the cross-point switch, 740. After forwarding each iword, processing determines whether the end of the data packet has been reached 750. If "yes", then return is made to await receipt of the next data packet 710.

Assuming that additional data portions of the packet are to be forwarded from the input port to the output port, processing determines whether the output port has signaled it is out of tokens for handling a next data portion 760. If "no", then a next "iword" of the data packet is forwarded to the cross-point switch 740, and this process repeats until all message portions have been forwarded.

If the output port is out of tokens, then a next portion of the data packet (i.e., a data "chunk") is forwarded to the central queue buffer 770 for retrieval by the output port when additional tokens are received. Further, if the initial request for the bypass path 720 was not granted, then processing would have initially sent a chunk of data to the central queue buffer from inquiry 730 as shown in FIG. 7. After sending the chunk of data to the central queue buffer, processing determines whether the end of the data packet has been reached 780. If "yes", then return is made to await receipt of a next data packet 710. Assuming that additional data portions of the packet are to be forwarded, then processing determines whether the output port is signaling to use the cross-point switch path 790. This signal from the output port may comprise the same signal used in the above described U.S. Pat. No. 5,546,391 to place a data portion into an emergency slot within the central queue buffer. In accordance with the principles of the present invention, the signal is used to initiate transfer of the next data portion, and subsequent data portions, from the central queue path to the bypass path. Therefore, if the output port is signaling that the cross-point switch is to be used 790, then processing transfers a next "iword" of data to the cross point switch 740. (Again an iword comprises a portion of a chunk of data.) Otherwise, a next chunk of data is forwarded to the central queue buffer 770.

With dynamic switching from the central queue path to the bypass path in accordance with the principles of the present invention, the preexisting need for dedicating space within the central queue for handling critical chunks is avoided. Therefore, all space within the central queue is able to be shared among the output ports, which in turn enhances performance of a switch network implemented in accordance with the principles of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

Additionally, at least one program storage device readable by a machine tangibly embodying at least one program of instructions executable by the machine to perform the capabilities of the invention can be provided.

The flow diagrams depicted herein are provided by way of example only. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for forwarding a data packet within a packet switch having an input port, an output port, and a bypass path and a central queue path coupled in parallel between the input port and the output port, said method comprising:

dividing the data packet into a sequence of multiple portions;

forwarding the sequence of multiple portions from the input port to the output port through the central queue path;

during said forwarding, determining that one portion of the multiple portions of the sequence comprises a critical portion; and switching forwarding of the sequence of multiple portions from the input port to the output port to the bypass path when said determining determines that said one portion of the multiple portions of the sequence comprises a critical portion, said switching resulting in passing said critical portion from said input port to said output port through the bypass path irrespective of whether contention exists for said output port.

2. The method of claim 1, wherein said determining comprises identifying said critical portion and forwarding a request for said critical portion back to said input port.

3. The method of claim 2, wherein said critical portion is a next portion needed at said output port of said sequence of multiple portions.

4. The method of claim 3, wherein said determining comprises checking said central queue path for said critical portion and forwarding said request for said critical portion back to said input port when said critical portion is missing from said central queue path.

5. The method of claim 1, further comprising returning from said bypass path to forwarding said sequence of multiple portions from the input port to the output port through the central queue path if said output port is unable to accept a next portion of said sequence.

6. The method of claim 1, wherein said central queue path comprises a central queue having shared memory only.

7. The method of claim 6, wherein said input port comprises multiple receivers, each receiver coupled to both said bypass path and said central queue path, and wherein said output port comprises multiple transmitters, each transmitter being coupled to both said bypass path and said central queue path.

8. The method of claim 1, further comprising continuing to forward portions of said sequence of multiple portions from said input port to said output port through the bypass path after passing said critical portion therethrough.

9. A system for forwarding a data packet within a packet switch having an input port, an output port, and a bypass path and a central queue path coupled in parallel between the input port and the output port, said system comprising:

means for dividing the data packet into a sequence of multiple portions;

means for forwarding the sequence of multiple portions from the input port to the output port through the central queue path;

means for determining that one portion of the multiple portions comprises a critical portion; and means for switching forwarding of the sequence of multiple portions from the input port to the output port to the bypass path responsive to said means for determining ascertaining that said one portion of the multiple portions comprises a critical portion, said switching resulting in passing said critical portion from said input port to said output port through the bypass path irrespective of whether contention exists for said output port.

10. The system of claim 9, wherein said critical portion of said sequence of multiple portions comprises a next portion of data needed at said output port.

11. The system of claim 9, further comprising means for returning from said bypass path to forwarding said sequence of multiple portions from the input port to the output port through the central queue path if said output port is unable to accept a next portion of said sequence.

12. The system of claim 9, wherein said central queue path comprises a central queue having shared memory only.

13. The system of claim 12, wherein said input port comprises multiple receivers, each receiver being coupled to both said bypass path and said central queue path, and wherein said output port comprises multiple transmitters, each transmitter being coupled to both said bypass path and said central queue path.

14. The system of claim 9, further comprising means for continuing to forward portions of said sequence of multiple portions from the input port to the output port through the bypass path after passing said critical portion therethrough.

15. A packet switch comprising:

multiple input ports and multiple output ports;

a central queue path coupling said multiple input ports to said multiple output ports;

a bypass path comprising a cross-point switching matrix coupling said multiple input ports to said multiple output ports, wherein said bypass path and said central queue path are coupled in parallel between said multiple input ports and said multiple output ports; and data packet flow control circuitry coupled to said multiple input ports and said multiple output ports for controlling transfer of a data packet from at least one input port of said multiple input ports to at least one output port of said multiple output ports, said data packet control circuitry being adapted to forward a sequence of multiple portions of the data packet from said at least one input port to said at least one output port through the central queue path, and to identify during said forwarding a next portion of said multiple portions of said sequence as a critical portion to said at least one output port, and in response thereto, to switch forwarding of the sequence of multiple portions of the data packet from the central queue path to the bypass path so that the critical portion is passed directly from the at least one input port to the at least one output port through the bypass path irrespective of whether contention exists for the at least one output port.

16. The packet switch of claim 15, wherein said central queue path comprises a central queue having shared memory only.

17. The packet switch of claim 16, wherein said data packet flow control circuitry is further adapted to continue to forward portions of said sequence of multiple portions from said at least one input port to said at least one output port through the bypass path after passing said critical portion therethrough.

18. The packet switch of claim 16, wherein said data packet flow control circuitry is further adapted to return forwarding of said sequence of multiple portions from said bypass path to said central queue path if said output port is unable to accept a next portion of said sequence of multiple portions.

19. An article of manufacture comprising:

a computer program product comprising computer usable medium having computer readable program code means therein for use in forwarding a data packet within a packet switch having an input port, an output port, and a bypass path and a central queue path coupled in parallel to the input port and the output port, said computer readable program code means in said computer program product comprising:

computer readable program code means for causing a computer to effect dividing the data packet into a sequence of multiple portions;

readable program code means for causing a computer to effect forwarding the sequence of multiple portions from the input port to the output port through the central queue path;

computer readable program code means for causing a computer to effect determining during said forwarding that one portion of the multiple portions of the sequence comprises a critical portion; and computer readable program code means for causing a computer to effect switching forwarding of the sequence of multiple portions from the input port to the output port through the bypass path when said determining determines that said one portion of the multiple portions of the sequence comprises a critical path, said switching resulting in passing said critical portion from said input port to said output port through the bypass path irrespective of whether contention exists for said output port.

20. The article of manufacture of claim 19, wherein said central queue path comprises a central queue having shared memory only.

21. The article of manufacture of claim 20, further comprising computer readable program code means for causing a computer to effect continuing forwarding portions of the sequence of multiple portions from the input port to the output port through the bypass path after passing said critical portion therethrough.

22. The article of manufacture of claim 21, further comprising computer readable program code means for causing a computer to effect returning forwarding of said sequence of multiple portions from the input port to the output port through the central queue path if the output port is unable to accept a next portion of said sequence.

* * * * *

UNITED STATES PATENT AND TRADEMARK OFFICE
CERTIFICATE OF CORRECTION

PATENT NO.    : 6,606,326 B1
DATED         : August 12, 2003
INVENTOR(S)   : Herring et al.

It is certified that error appears in the above-identified patent and that said Letters Patent is hereby corrected as shown below:

Column 15,
Line 60, insert the word -- unless -- after the word "frequently"

Column 22,
Line 20, insert the word -- computer -- before the word "readable"

Signed and Sealed this

Ninth Day of December, 2003

JAMES E. ROGAN
*Director of the United States Patent and Trademark Office*